United States Patent [19]

Quick

[11] 4,019,308

[45] Apr. 26, 1977

[54] BASE CUTTING APPARATUS FOR SUGAR CANE HARVESTERS

[75] Inventor: Donald J. Quick, Bundaberg, Australia

[73] Assignee: Massey-Ferguson Services N.V., Curacao, Netherlands Antilles

[22] Filed: Oct. 10, 1975

[21] Appl. No.: 621,275

[30] Foreign Application Priority Data

Dec. 27, 1974   United Kingdom ............. 55890/74

[52] U.S. Cl. .................................... 56/13.9; 56/60; 56/295

[51] Int. Cl.² ................. A01D 55/26; A01D 45/02; A01D 45/10

[58] Field of Search ....... 56/13.9, 295, 255, 51–98, 56/15.7

[56] References Cited

UNITED STATES PATENTS

| | | | |
|---|---|---|---|
| 498,533 | 5/1893 | Clousing | 56/255 |
| 2,028,784 | 1/1936 | Jennett | 56/233 X |
| 2,475,716 | 7/1949 | Nabors | 56/15.7 |
| 2,787,881 | 4/1957 | McDaniel | 56/295 |
| 3,343,350 | 9/1967 | Freedlander et al. | 56/295 |
| 3,434,271 | 3/1969 | Gaunt et al. | 56/60 |

FOREIGN PATENTS OR APPLICATIONS 119,954   4/1901   Germany ............................. 56/255

*Primary Examiner*—Russell R. Kinsey
*Attorney, Agent, or Firm*—Robert L. Farris

[57] ABSTRACT

A sugar cane harvester has a pair of contrarotatable base cutters with projecting blades to sever cane sticks from their roots. The base cutters are constructed to minimize the quantity of earth fed into the harvester with the crop. A large free area is provided between successive blades for earth and rocks to drop out, but each blade has a long exposed cutting edge to prevent cane sticks entering said area without being cut. The blades are mounted on a support member having a flat profile to minimize the paddling action of the base cutters on earth and rocks.

1 Claim, 7 Drawing Figures

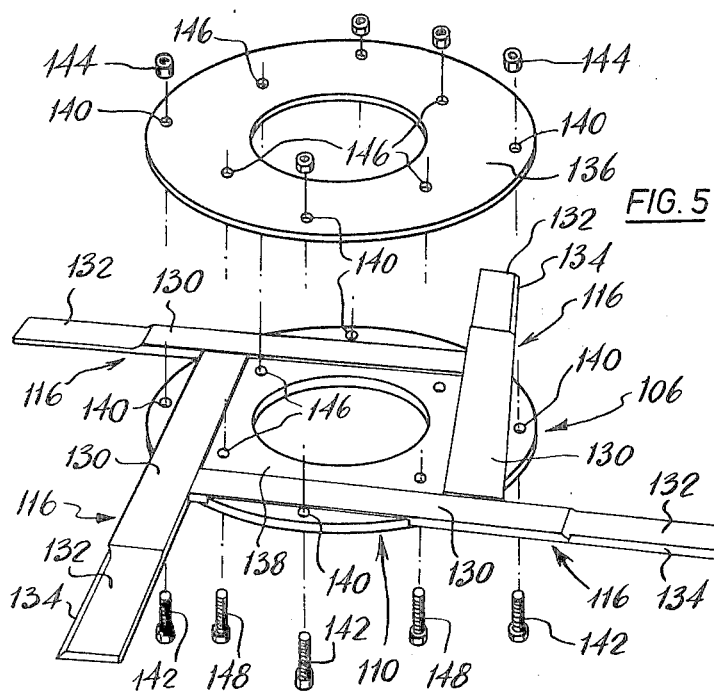
FIG. 5
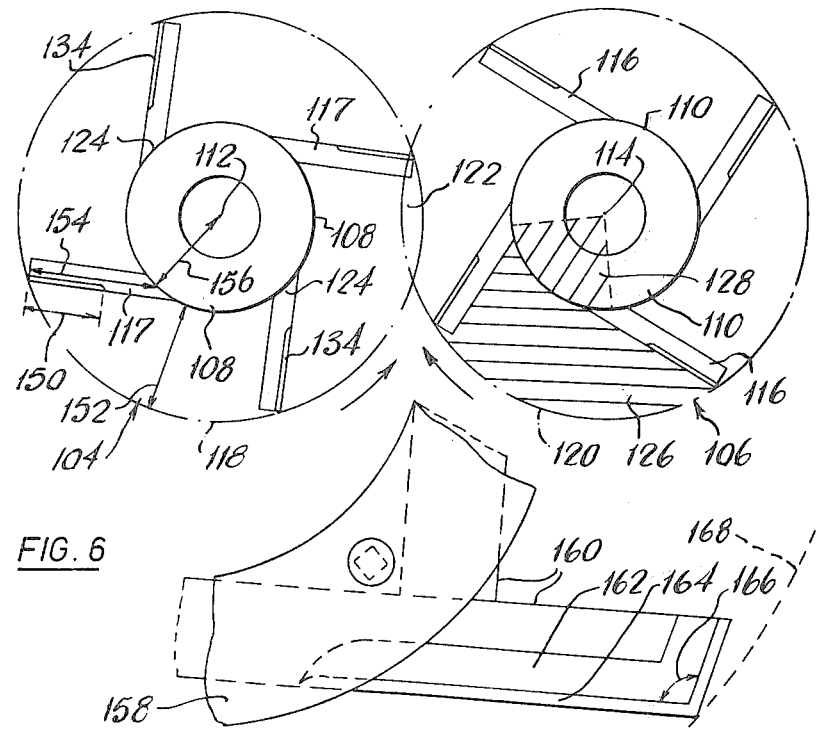
FIG. 6
FIG. 7

BASE CUTTING APPARATUS FOR SUGAR CANE HARVESTERS

This invention relates to sugar cane harvesters and in particular to the base or stool cutting apparatus in sugar cane harvesters whereby cane sticks are severed from their roots.

In sugar cane harvesters in current use the base cutting apparatus usually comprises a pair of contrarotatable discs each carrying a series of outwardly projecting blades at its periphery. A row of cane passes between the discs and the blades sever the cane sticks — usually about 1 or 2 inches below the surface of the ground.

Problems which arise in the use of the base-cutting apparatus referred-to in the last preceding paragraph include the feeding of earth and stones into the harvester, substantial wear of the discs, and damage to the discs and blades by rocks passing between the discs.

Various proposals have been made for alleviating these problems but none of these proposals has met the requirement of reducing the tendency to feed earth into the harvester with the cane sticks while at the same time maintaining acceptable cutting efficiency. It is an object of this invention to meet or more nearly meet this requirement.

According to the invention there is provided a sugar cane harvester as defined in claim 1 of the accompanying claims.

The term "free area between successive blades of the cutter" as used in this specification means that area defined on two sides by the opposed of facing edges of the said blades, by the cutting circle traces by the tips of the blades on the third or outer side, and by the periphery of the blade support member at its inner side. The area of the portion of the blade support member lying between said blades means the area obtained by dividing the total upwardly-facing surface area of said member by the number of blades mounted thereon.

An embodiment of the invention will now be described by way of example with reference to the accompanying drawings in which:

FIG. 5 shows a perspective exploded view of an alternative base cutter;

FIG. 6 shows a plan view of the arrangement of two base cutters as shown in FIG. 5; and FIG. 7 is a plan view of a portion of another base cutter showing a further blade construction.

Figure 1:
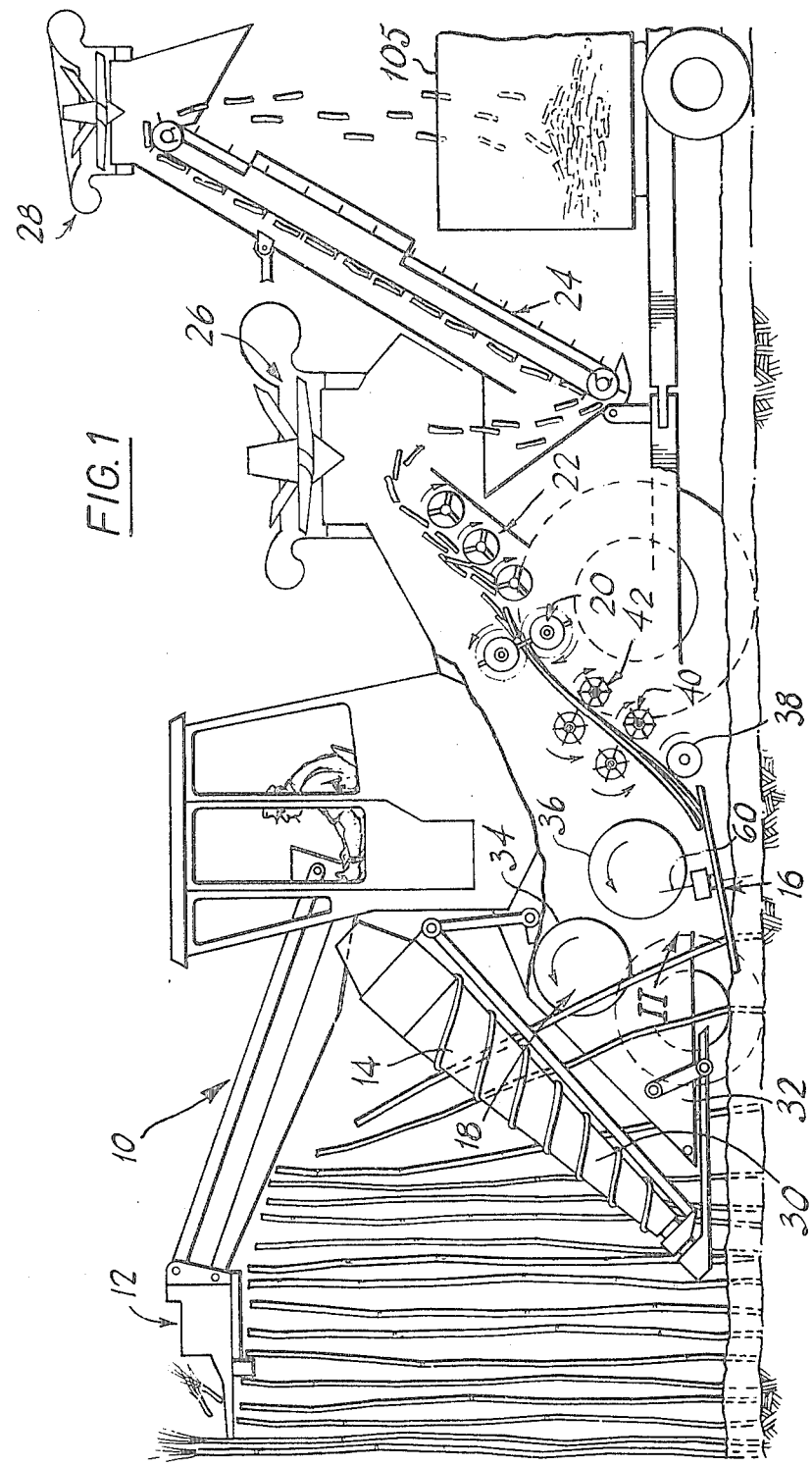
FIG. 1 shows, somewhat diagrammatically, a sugar cane harvester in side elevation and partly cut away to show its crop handling apparatus.

As shown in FIG. 1, a sugar cane harvester 10 comprises a top cutting unit 12, stick gathering apparatus 14, base cutting apparatus 16, stick feeding apparatus 18, stick chopping apparatus 20, a billet conveyor 22, a chain and slat type billet elevator 24 and two sets of trash removal apparatus 26 and 28.

Stick gathering apparatus 14 comprises a pair of rotatable crop lifting augers 30 mounted above respective transversely spaced crop gathering walls 32 defining a crop gathering throat.

Base cutting apparatus 16 will be described more fully below.

Figure 2:
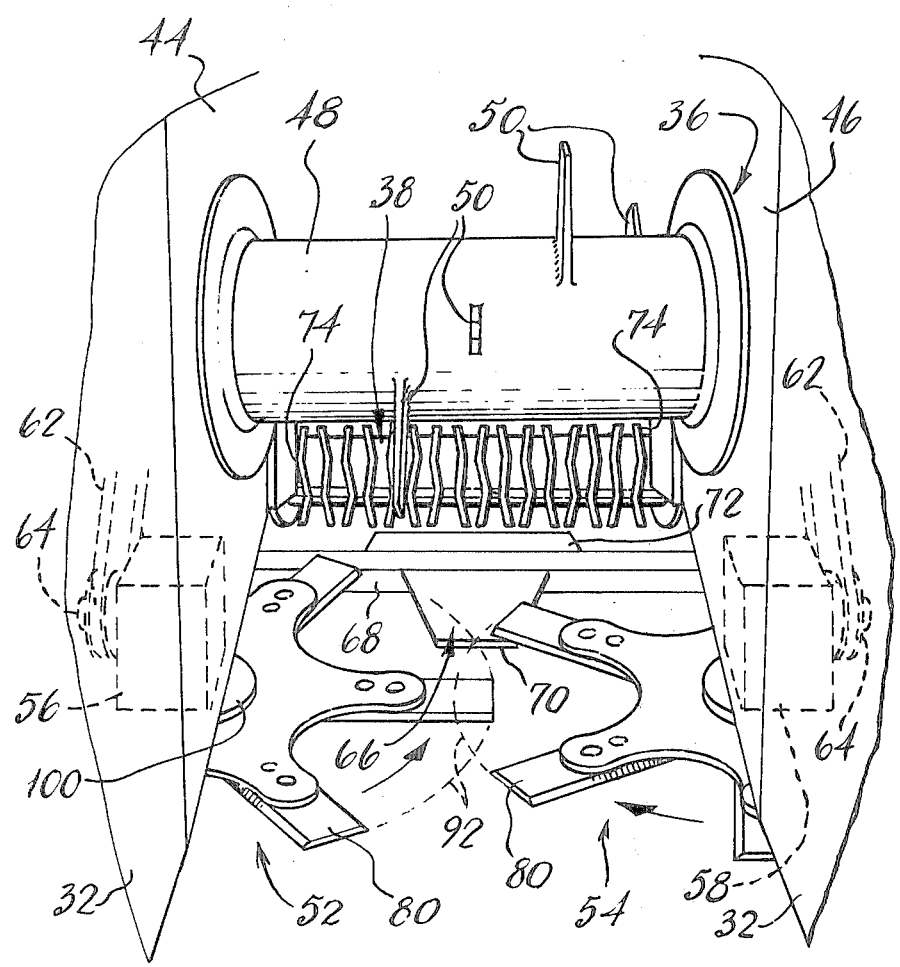
FIG. 2 shows a perspective view in the direction indicated by arrow II in FIG. 1 of a pair of rotatable base cutters in the crop gathering throat of the harvester.

Stick feeding apparatus 18 comprises a pair of large power-rotated feed-in rollers 34, 36, each having the same structure. Roller 36 is shown in FIG. 2 and will be described below. The stick feeding apparatus further comprises a butt lifter roller 38, and two pairs 40, 42 of paddle-type cane feeding and cleaning rollers.

Stick chopping apparatus 20 comprises a pair of contra-rotatable drums each carrying a pair of axially extending projecting blades. The drums rotate in timed relationship so that the blades co-operate with each other in a chopping action.

Billet conveyor 22 comprises three paddle rollers all rotating in the same direction.

Referring now to FIG. 2, crop gathering walls 32 converge rearwardly and lead to the main feed passage of the harvester defined by a pair of substantially parallel walls 44, 46.

Feed roller 36 is mounted between the walls 44, 46 and is power rotated in the direction indicated by the arrow. The roller comprises a tubular shaft 48 carrying a series of outwardly projecting prongs 50 fixed thereto at spaced apart positions on a common helix.

Below roller 36 there is located the base cutting apparatus 16 comprising a pair of base cutters 52, 54. The base cutters each have the same structure and are mounted on respective drive gearboxes 56, 58 for rotation about respective upwardly and forwardly extending axes 60.

The gearboxes 56, 58 are bolted to walls 44, 46 and driven by chains 62 engaging drive input sprockets 64 on the gearboxes.

Rearwardly of the base cutters 52, 54 there is provided a sill plate assembly 66 located between the base cutters and the butt lifter roller 38. The sill plate assembly 66 comprises a transverse strut 68 secured below walls 44, 46 and having forwardly and rearwardly projecting tapering horizontal sill plates 70, 72 respectively mounted thereon flush with the upper surface of the strut. The sill plates are positioned centrally between walls 44, 46.

But lifter roller 38 rotates in the direction shown in FIG. 1 and has a series of transversely spaced corrugated washers 74 defining circumferentially extending grooves which are each of varying width. The washers act to grip the butt ends of the cane sticks and lift them upwards so as to feed the sticks over the roller and towards chopper drums 20.

Each of the base cutters 52, 54 comprises a central blade support member 76 formed with six projecting blade support arms 78. An oblong rectangular blade 80 is held by two rivets 82 or by countersunk square-necked bolts and associated nuts to each arm 78. Each blade is formed of spring steel and chamfered and hardened along its two long edges to form sharpened cutting edges 84. A curved recess 86 is formed in the blade support member between successive arms 78.

Figure 3:
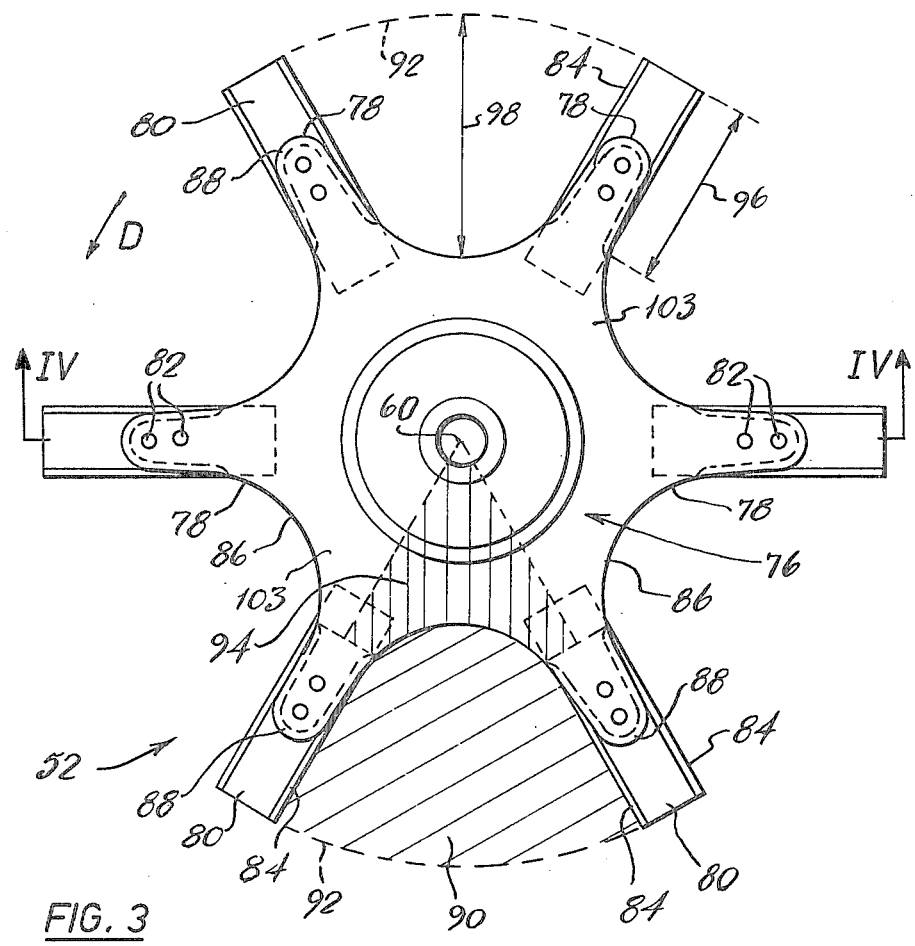
FIG. 3 shows a plan view of one of the base cutters of FIG. 2.

The side edge of each of the blade support arms 78 is hard-faced with a nickel chrome alloy available in Australia under the name "Hardcraft 850." The hardened zone is indicated in FIGS. 2 and 3 by the reference numeral 88.

As shown in FIG. 2, the free area 90 (shown cross hatched and defined at its outer side by the cutting circle 92 traced by the tips of the blades 80) between successive blades 80 of the base cutters is larger than the area 94 (also shown cross hatched) of the portion of the blade support member lying between said blades.

Also, the length 96 of the sharpened edge 84 of each blade 80 which is available for cutting (i.e., is not masked by the blade support member 76) is considerably larger than one third of the maximum radial distance 98 between the periphery of the blade support member 76 and the cutting circle 92 traced by the tips of blades 80 measured for the portion 86 of said periphery which lies between the blade under consideration and the blade which precedes it, having regard to the direction D of rotation of the base cutter. One third of the distance 98 represents the minimum length of exposed cutting edge consistent with obtaining a satisfactory cut.

Figure 4:
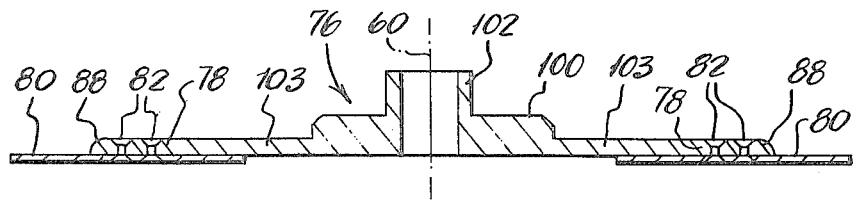
FIG. 4 shows a section on the line IV-IV in FIG. 3.

As shown in FIG. 4, blade support member 76 comprises a central hub portion 100 having a sleeve 102 to receive a drive shaft projecting from one of the gearboxes 56, 58, and an outer portion 103 lying between the hub portion and blade support arms 78. Outer portion 103 is in the form of a disc and has a substantially flat profile. When mounted on their respective gearboxes, the base cutters 52, 54 are positioned (see FIG. 2) so that blades 80 pass over and close to the forward end of the sill plate 70.

Use of cane harvester 10 will now be described. Cane tops are removed from standing cane by topper 12 and the cane sticks are severed from their roots by base cutters 52, 54 and fed inwards by stick feeding apparatus 18 to the stick chopping apparatus 20. Billets from the chopping apparatus are carried rearwards by elevators 22 and 24 and finally dropped into a transport vehicle 105. Trash is removed from the billets by trash removal apparatus 26 and 28 at the upper end of each elevator.

The blades 80 of the base cutters 52, 54 sever the cane sticks at ground level or at a level not more than about 2 inches below ground level — according to the height setting of the front wheels of the harvester. The base cutters contrarotate in timed relationship, the blades of one cutter passing between the blades of the other — due to overlap of their cutting circles 92.

As the base cutters rotate, although their direction of movement is such as to tend to move earth inwards with the cane sticks, the large free area between successive blades allows the earth together with stones or rocks to fall back onto the ground. The relatively small area of the blade support members 76 minimizes the amount of earth which can be carried thereon. The flat profile of the outer portions of the blade support members minimizes the paddling action of the base cutters — which in certain previously proposed base cutters has caused earth and stones to be conveyed inwards with the cane.

The provision of a relatively long sharpened edge 84 on each blade of the base cutters ensures that their reduced tendency to feed-in earth with the cane is not accompanied by an unacceptable reduction in cutting efficiency — as has been the case with previous attempts in this direction. The relatively long cutting edge taken together with the usual rate of rotation of base cutters ensures little likelihood of cane sticks being able to get into the recesses 86 between successive blades 80 without being severed.

FIGS. 5 and 6 show an alternative basecutter-assembly for use in a manner analogous to that of the embodiment of FIGS. 1 to 4.

Base cutters 104, 106 comprise respective annular blade support members 108, 110 which are each bolted to a drive member (not shown) on a gearbox (not shown) for rotation about respective upwardly extending axes 112, 114. The blade support members 108, 110 carry respective sets of four projecting blades 116, 117.

The cutting circles 118, 120 described by the tips of blades 116, 117 of base cutters 104, 106 respectively overlap in a central zone 122. Each blade is inclined with respect to a radius from the axis 112 or 114 of the cutter passing through the inner end 124 of the blade, the blade lying on the trailing side of said radius with respect to the direction of rotation of the cutter. The blades are each substantially parallel to a tangent to the blade support member 108 or 110 the tangent being taken at a location mid-way between the blade and the preceding blade having regard to the direction of rotation of the cutter.

As shown in FIG. 6 the free area 126 (shown crosshatched) between successive blades of the cutters is larger than the area 128 of the portion of the blade support member lying between said blades.

Each blade 116 of cutter 106 is in the form of a rectangular strip of hardened spring steel having a shank portion 130 secured to the blade support member 110 and a thinner cutting portion 132 at its outer end. The cutting portion is less than 3 millimeters thick.

One side edge on the upper surface of cutting portion 132 of each blade is formed with a chamfer 134 providing a cutting edge.

Blade support member 110 comprises an upper disc or plate 136 and a lower disc or plate 138. The lower disc is formed with four slots arranged in a square, one slot to receive the shank 130 of each blade and the depth of each slot being slightly less than the thickness of said shanks.

Plates 136, 138 are formed with alignable holes 140 to receive threaded bolts 142 having associated nuts 144 whereby the blades 116 may be securely clamped in position between the plates. The blades can thus be easily removed for replacement and adjusted outwards to compensate for wear.

An inner series of alignable holes 146 is formed in each of the plates 136, 138 to receive bolts 148 whereby the cutters are secured to the drive members (not shown) of their respective gearboxes. Base cutter 104 has a structure identical to that of base cutter 106 but is provided with blades 117 chamfered along the opposite side edge as compared with blades 116.

As shown in FIG. 6, the length 150 of the sharpened edge of each blade 116 or 117 available for cutting is greater than one third of the radial distance 152 between the periphery of the respective blade support member 108 or 110 and the cutting circle 118 or 120. As already explained, this ensures effective severance of the sugar canes from their roots, despite the large free area 126 between successive blades 116 and 117.

In this embodiment, the whole of each blade support member 108 and 110 has a substantially flat profile — thereby avoiding any paddling action on the earth and stones encountered during use.

A further feature of this embodiment is that the blades 116, 117 themselves are relatively long. The length 154 of the portion of each blade 116 or 117 projecting from its blade support member 110 or 108 respectively is greater than the radial distance 156 between the axes of rotation 114 or 112 of the base cutter and the edge of the blade support member adjacent the blade. In the case of a circular blade support member as in this embodiment, distance 156 is of course the radius of the blade support member. It is desirable that length 154 should be at least one third and preferably one half or more of distance 156 — as will be explained.

In use, this embodiment operates in substantially the same manner as the previously embodiment, achieving effective cane cutting while feeding a minimum of earth into the harvester with the cane — for the same reasons as the previous embodiment. As in the previous embodiment, due to the relatively small size of the blade support members 108 and 110 there is less build-up of sticky mud on top of the base cutters when operating in wet conditions. Such mud interferes with adjacent structures and causes power loss. Likewise, due to the small size of the blade support members 108 and 110 they do not penetrate the ground and are therefore less subject to abrasive wear than conventional base cutters.

Further advantages, which apply more particularly to this embodiment than to the previous embodiment are:
1. The comparatively long blades are able to bend and flex to accommodate rocks. Blade tip deflections of 25 millimeters are possible. As a result, less strain is imposed on the drive train to the base cutters.
2. The blades can easily be adjusted outwards to compensate for wear and thereby maintain the desirable degree of overlap of the base cutter cutting circles.

FIG. 7 shows a further embodiment, otherwise constructed as in the embodiment of FIGS. 5 and 6, but with a relatively larger blade support member 158. The blades 160 are each formed with a wide chamfered portion 162 extending along oneside edge and along the outer end edge. The chamfered portion 162 provides a cutting edge 164 along both said edges of the blade. The internal angle 166 between these portions of the cutting edge is somewhat greater than 90°. In this embodiment, the exposed portion of the cutting edge 164 extends all the way from the periphery of the blade support member 158 to the cutting circle 168 of the base cutter.

Among modifications within the scope of the invention which can be introduced into the above embodiments is the use of blades having non-linear cutting edges. In such a case the length of the cutting edge is to be measured following the contours of the cutting edge.

I claim:
1. A sugar cane harvester including a main frame, a pair of spaced rotatable crop lifting augers mounted on the forward portion of the frame, a pair of spaced substantially parallel walls mounted on the frame to the rear of the crop lifting augers to define a main feed passage, an improved cane base cutter mounted on each of the parallel walls for severing cane at the surface of the ground or below, a butt lifter and feed rollers rotatably mounted between the parallel walls for conveying cane up and to the rear, a cane chopping apparatus mounted on the main frame for receiving cane from the butt lifter and feed rollers and chopping the cane into billets, and billet cleaning and conveying means mounted on the frame for conveying billets away from the cane chopping apparatus and for separating trash from the billets, wherein said improved base cutters each include a gear box mounted on one of said parallel side walls, a drive shaft extending generally downward from the gear box, a generally flat central blade support member supported and driven by said drive shaft, a plurality of integral generally flat blade support arms extending outwardly from and forming an integral part of the central blade support member and a generally flat blade attached to the bottom of each of the blade support arms and extending outwardly therefrom.

* * * * *